US009607194B2

(12) United States Patent
Randjelovic

(10) Patent No.: US 9,607,194 B2
(45) Date of Patent: Mar. 28, 2017

(54) HALF-DUPLEX PASSIVE TRANSPONDER

(75) Inventor: Zoran Randjelovic, Marin (CH)

(73) Assignee: EM Microelectronic-Marin SA, Marin (CH)

( * ) Notice: Subject to any disclaimer, the term of this patent is extended or adjusted under 35 U.S.C. 154(b) by 587 days.

(21) Appl. No.: 14/110,495

(22) PCT Filed: Apr. 5, 2012

(86) PCT No.: PCT/EP2012/056271
§ 371 (c)(1),
(2), (4) Date: Oct. 8, 2013

(87) PCT Pub. No.: WO2012/139966
PCT Pub. Date: Oct. 18, 2012

(65) Prior Publication Data
US 2014/0049378 A1     Feb. 20, 2014

(30) Foreign Application Priority Data

Apr. 11, 2011 (EP) .................................. 11161917

(51) Int. Cl.
*G06K 7/10* (2006.01)
*G06K 19/07* (2006.01)
(52) U.S. Cl.
CPC ..... *G06K 7/10366* (2013.01); *G06K 19/0701* (2013.01); *G06K 19/0723* (2013.01)
(58) Field of Classification Search
CPC .......... G06K 19/0701; G06K 19/0708; G06K 19/0709; G06K 19/0723; G06K 7/10366; G06K 7/10

(Continued)

(56) References Cited

U.S. PATENT DOCUMENTS

2002/0119751 A1* 8/2002 Baumann ........... G06K 19/0723
455/41.2
2005/0134234 A1* 6/2005 Kaiser ............... G06K 19/0723
320/166

(Continued)

FOREIGN PATENT DOCUMENTS

DE     10 2007 041 154     3/2009

OTHER PUBLICATIONS

International Search Report Issued Oct. 18, 2012 in PCT/EP12/056271 Filed Apr. 5, 2012.

*Primary Examiner* — Brian Wilson
(74) *Attorney, Agent, or Firm* — Oblon, McClelland, Maier & Neustadt, L.L.P.

(57) ABSTRACT

A half-duplex passive transponder including: a resonant circuit including an antenna and input capacitor and configured to allow an electrical signal to oscillate in the resonant circuit when periodically receiving across the antenna an activation signal from a reader; at least one switch between the input capacitor and a storage capacitor so the two capacitors are in parallel when the switch is turned on; a peak voltage detector configured to measure amplitude of the electrical signal oscillating in the resonant circuit; and a variable voltage threshold determination circuit configured to trigger each of plucking pulses when voltage of the oscillating electrical signal substantially attains a variable voltage threshold in a respective period before an extremum of the oscillating electrical signal and in a half-cycle of the extremum, to thus deliver plucking pulses during a transmission period in the resonant circuit to maintain a certain amplitude of the oscillating electrical signal.

14 Claims, 3 Drawing Sheets

(58) Field of Classification Search
USPC .............. 340/572.1–572.7, 10.4, 10.41, 10.5,
340/10.1–10.6; 331/1 R, 15, 16, 34,
331/107 R, 117 R, 165, 182; 332/123,
332/155, 159; 455/255–265; 320/166,
320/160, 108, 141
See application file for complete search history.

(56) References Cited

U.S. PATENT DOCUMENTS

| | | | | |
|---|---|---|---|---|
| 2007/0007343 A1* | 1/2007 | Ganz | ................ | G06K 19/0723 235/435 |
| 2009/0174592 A1* | 7/2009 | Muellner | ................ | H04B 1/00 342/51 |

* cited by examiner

HALF-DUPLEX PASSIVE TRANSPONDER

FIELD OF THE INVENTION

The present invention concerns the field of half-duplex passive transponders, i.e. which transmit data in an alternating manner with a reader. This type of transponder includes a resonant circuit formed by an antenna and an input capacitor, a rectifier arranged downstream of the resonant circuit, i.e. positioned after said circuit, and an energy storage capacitor arranged downstream of the rectifier. The transponder receives the energy needed for its operation from a reader which periodically transmits an activation signal, which may be formed by a continuous carrier signal. This activation signal may also be modulated when the reader sends a command or data to the transponder. The transponder sends a modulated signal, particularly a frequency modulated signal (FSK modulation), in the periods of time in which the reader is not delivering an activation signal. To achieve this, the oscillating signal is maintained in the resonant circuit using the energy stored in the storage capacitor by a switch for temporarily connecting the input capacitor in parallel to said storage capacitor. The conventional method consists in powering the resonant circuit periodically for short durations using the storage capacitor to maintain, at least for a certain period during which the transponder sends a modulated signal, sufficient oscillation amplitude and preferably a peak voltage close to the storage capacitor voltage. This method is known as "plucking" and will be referred to as such below.

BACKGROUND OF THE INVENTION

A transponder of the aforementioned type and a "plucking" method are known from U.S. Pat. No. 5,621,396. In order to optimise the power supply to the resonant circuit as a function, in particular, of the quality factor of the transponder, i.e. to provide sufficient power to maintain oscillation amplitude over a maximum duration, this document proposes to arrange a peak detector for the oscillating signal in the resonant circuit and to compare the peak value detected in a half-cycle of the oscillating signal with a reference voltage. As soon as the peak value is lower than this reference voltage, the resonant circuit is powered via a switch. The power is only provided periodically by identical pulses; the power frequency therefore varies according to the quality factor of the transponder.

SUMMARY OF THE INVENTION

It is an object of the present invention to provide a passive half-duplex transponder with a relatively simple control circuit for optimising the efficiency of maintenance of the oscillating signal in the resonant circuit.

The present invention therefore concerns a passive half-duplex transponder comprising:
- a resonant circuit formed by an antenna and an input capacitor and arranged to allow an electrical signal to oscillate in the resonant circuit when it periodically receives across the antenna an activation signal from a reader;
- a rectifier arranged downstream of the resonant circuit;
- an energy storage capacitor arranged downstream of the rectifier;
- at least one switch arranged between the input capacitor and the storage capacitor so that the two capacitors are placed in parallel when the switch is turned on (ON);
- a peak voltage detector arranged to measure the amplitude of the electrical signal oscillating in the resonant circuit;

wherein the transponder is arranged to send at least one communication signal to the reader in a transmission period when the activation signal is interrupted, and to deliver "plucking" pulses during this transmission period in the resonant circuit so as to sustain the oscillation of the electrical signal while maintaining at least a certain amplitude of the oscillating electrical signal. This transponder further includes a circuit for defining a variable voltage threshold used to trigger said "plucking" pulses, the variable voltage threshold determination circuit defining, for each "plucking" pulse or for each group of successive "plucking" pluses, a specific voltage threshold which is lower in absolute value than the last peak voltage measured by the peak voltage detector relative to the medium voltage of the oscillating electrical signal and dependent on said last measured peak voltage. The transponder is arranged to trigger each "plucking" pulse when the voltage of the oscillating electrical signal substantially reaches the specific voltage threshold in a respective period before one extremum of the oscillating electrical signal and in the half-cycle of that extremum.

The "medium voltage" of the oscillating electrical signal means an average voltage of the two extremes of each half-cycle in the resonant circuit.

According to a preferred variant of the invention, the variable voltage threshold is determined so that it is located within a range comprised between 50% and 90% of the last peak voltage measured relative to the medium voltage of the oscillating electrical signal.

According to a preferred embodiment of the invention, the peak voltage detector measures the peak voltage in the first half-cycle of each oscillation of the oscillating electrical signal and after each peak voltage measurement, the variable voltage threshold determination circuit redefines the specific threshold voltage required to trigger a "plucking" pulse in the second half-cycle of the same oscillation.

Other particular features of the invention will be set out below in the detailed description of the invention

BRIEF DESCRIPTION OF THE DRAWINGS

The invention will be described below with reference to the annexed drawings, given by way of non-limiting example, and in which.

DETAILED DESCRIPTION

Figure 1:
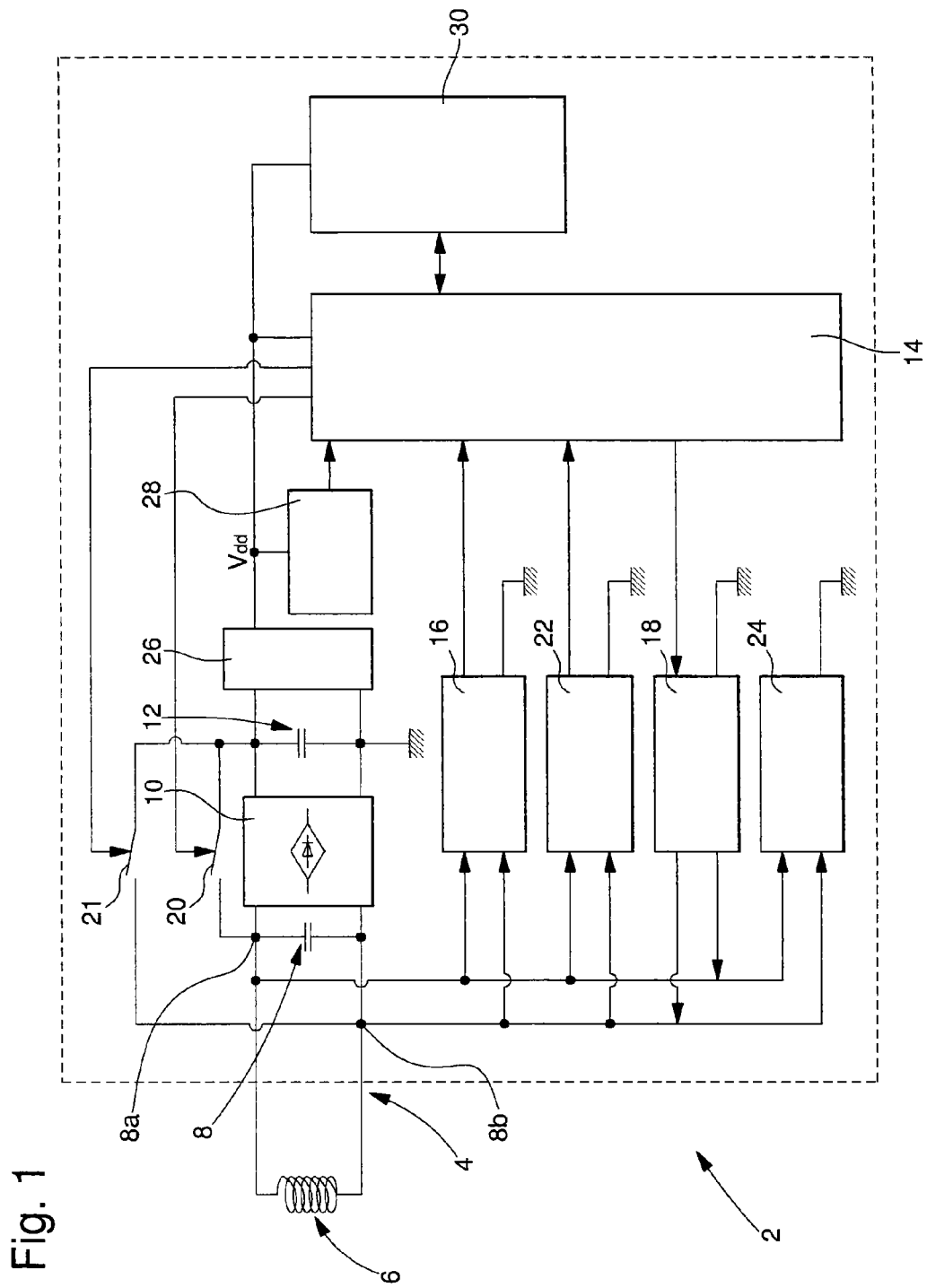
FIG. 1 is a schematic view of the general structure of an embodiment of the transponder of the invention.

FIG. 1 shows the electronic circuit of a general embodiment of a passive half-duplex transponder 2, which includes:

a resonant circuit 4 formed by an antenna 6 and an input capacitor 8 which are arranged to allow an electrical signal to oscillate in the resonant circuit when the transponder periodically receives an activation signal across the antenna from a reader (not shown);

a full-wave rectifier 10 arranged downstream of the resonant circuit;

an energy storage capacitor 12 arranged downstream of the rectifier;

a logic circuit 14;

a means for generating a clock signal 16;

a modulator 18 connected at input to the logic circuit and at output to the resonant circuit;

a first switch 20 arranged between the first terminal 8a of input capacitor 8 and storage capacitor 12, so that the two capacitors are placed in parallel when switch 20 is turned on (ON), in a half-cycle of the oscillating electrical signal appearing across terminal 8a;

a second switch 21 arranged between the second terminal 8b of input capacitor 8 and storage capacitor 12, so that the two capacitors are placed in parallel when switch 21 is turned on (ON) in a half-cycle of the oscillating electrical signal appearing across terminal 8b;

a peak voltage detector 22 arranged, at least periodically, to measure the peak voltage 34A, 34B, 34C of the electrical signal 32 oscillating in resonant circuit 4.

Figure 2:
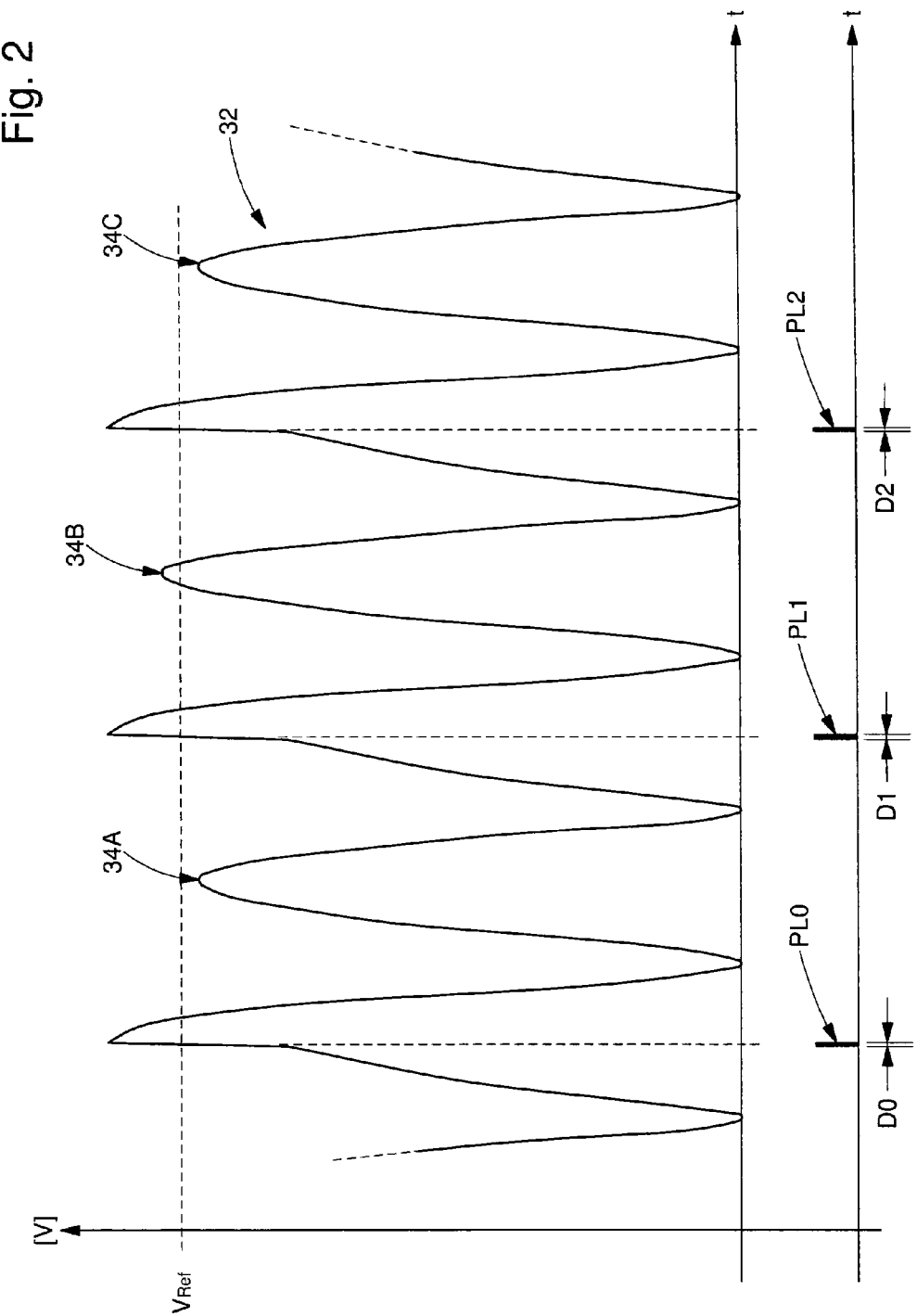
FIG. 2 shows a variant of the electrical signal oscillating in the resonant circuit of the transponder which is followed by a full-wave rectifier, in a period where the transponder transmits a response signal to a reader with which it communicates.

The "peak voltage" means in general the voltage value of one extremum of the oscillating signal. In the case of a full-wave rectifier and the circuit configuration shown in FIG. 1, the peak detector receives rectified half-cycles at input alternately from the two input capacitor terminals 8a and 8b. The detector therefore receives a signal 32 as shown in FIG. 2 with the two half-cycles of each oscillation each defining a positive peak voltage. In other variants with a half-wave rectifier, a distinction can be drawn between two cases depending upon whether one of the two terminals 8a and 8b is connected to earth or to Vdd (or Vcap). In the case where terminal 8b remains connected to earth, only the positive half-cycles are rectified and only the peak voltage of these positive half-cycles can be measured. In the case where terminal 8a remains connected to Vdd (or Vcap), the voltage across terminal 8b will vary substantially between zero and 2Vdd. In this latter case, there are maximums above Vdd and minimums below Vdd (maximums and minimums defining extremums). The "plucking" pulses are provided in the half-cycles with voltage minimums and it is these voltage minimums which are detected by the peak voltage detector. With a half-wave rectifier, only one switch connected to the variable voltage terminal is required.

Transponder 2 of FIG. 1 is arranged to send at least one switching signal to the reader, in a transmission period where the activation signal is interrupted, by means of modulator 18 which modulates the oscillating electrical signal. FIG. 2 shows the oscillating electrical signal 32 as it appears alternatively at terminals 8a and 8b of capacitor 8 of the resonant circuit. In general, logic circuit 14 controls switch 20 and/or switch 21 to deliver "plucking" pulses in resonant circuit 4 to sustain the oscillating electrical signal while maintaining a certain amplitude at least during the transmission periods. The logic circuit is arranged to control switch 20 and/or switch 21 by varying the duration of the "plucking" pulses so as to manage the electrical power supply of the resonant circuit via storage capacitor 12 during the transponder transmission periods, and preferably so as to optimise the electrical power supply. The duration of the "plucking" pulses is called the "plucking duration". Preferably, logic circuit 14 is arranged to vary the "plucking duration" in steps. Transponder 2 also includes a limiter 24, a voltage regulator 26, a power management circuit 28 and a non-volatile memory 30.

In general, in a preferred variant, at least when the transponder transmits an RF communication signal via its antenna 6, peak voltage detector 22 at least periodically measures the peak voltage (extremum) in one half-cycle of the electrical signal oscillating in resonant circuit 4. This peak voltage is processed by logic circuit 14 to determine the "plucking" duration (duration of the "plucking" pulse) at least in one subsequent half-cycle of the oscillating electrical signal and to determine the start (i.e. the trigger) of each "plucking" pulse in said at least one subsequent pulse, so that the triggering of each "plucking" pulses occurs in a respective period before one extremum of the oscillating electrical signal and in the half-cycle of said extremum.

According to a preferred variant, when the transponder sends a communication signal to a reader, the peak voltage is measured in the first half-period of each oscillation of the resonant circuit and a "plucking" pulse PL0, PL1, PL2 is then delivered in the second half period of the oscillation, as shown in FIG. 2. In that case, one of the two switches 20 and 21 is unnecessary. The peak voltage measurement occurs in each half-cycle which appears across the terminal of the capacitor 8 not connected to the switch and the "plucking" pulse is delivered in each subsequent half-cycle which appears across the other terminal of the capacitor connected to the switch. It will be noted that another variant may also be devised where this measurement is performed at a lower frequency than the oscillation frequency and may be used to determine the sending of several "plucking" pulses. It will be noted that it is possible to arrange for the "plucking" pulses to be delivered periodically with a lower frequency than the oscillation frequency.

According to a particular variant, when the peak voltage measured in one half-cycle is higher than a first reference voltage, the logic circuit decreases the "plucking" duration in at least the next half-cycle. This first reference voltage is preferably determined by the transponder itself as a function of the initial voltage of energy storage capacitor 12 and possibly as a function of the transponder quality factor and thus of the attenuation of the oscillating electrical signal in the resonant circuit in the absence of any power supply or, equally, as a function of the decrease in voltage across the storage capacitor terminals during a transponder transmission period, when the capacitor powers the resonant circuit to maintain substantially constant amplitude of the oscillating electrical signal.

According to a first specific variant, the first reference voltage remains constant in each period where a communication signal is transmitted by the transponder. In this variant, the constant value is either predefined and written in memory 30, or is determined by the transponder as a function of the initial storage capacitor voltage, i.e. the voltage value of said capacitor at the start of the transmission period. According to a second specific variant, the first reference voltage is a function of said storage capacitor voltage in said transmission period. In this second variant, it is possible to distinguish three particular cases of transponder operation. In a first case, the curve of the first reference voltage is predefined and stored in the transponder memory. In the second case, the function is predefined, particularly the negative slope of an affine straight line, but the level of the curve, i.e. its initial value, is determined as a function of the initial value of the storage capacitor. In the third case, the storage capacitor voltage is at least periodically measured during a transmission period and the first reference voltage is determined at least in steps according to the measurement.

According to another variant, when the peak voltage is lower than a second reference voltage which is lower than the first reference voltage, the logic circuit increases said "plucking" duration in at least the next half-cycle. This second reference voltage is preferably determined by the transponder itself in accordance with the same criteria mentioned for the first reference voltage. It will also be noted that the second reference voltage may simply be determined as a function of the first reference voltage. By way of example, the difference between these two reference voltages may be constant or the ratio between them may be constant. Thus, according to a first variant, the second reference voltage remains constant in each period of transmission of a communication signal by the transponder. According to a second variant, the second reference voltage is a function of said storage capacitor voltage in said transmission period or a function of the first reference voltage.

To save electrical energy, when the transponder sends a communication signal to a reader, the peak voltage is only periodically measured after a certain number of oscillation periods. In this operating mode, in a particular variant, the "plucking" duration is constant in each period formed of this certain number of oscillation periods.

In the variant embodiment shown in FIG. 2, the second reference voltage is identical to said first reference voltage and forms the same single reference voltage $V_{Ref}$. Peak voltage 34A, 34B, 34C is measured by peak voltage detector 22 in the first half period of each oscillation period, i.e. of each period of the electrical signal oscillating in resonant circuit 4. In the second half period of each oscillation period, a "plucking" pulse PL0, PL1, PL2 is provided (except in the particular case where the "plucking" duration would be reduced to zero in the particular variant allowing this case).

Detection of peak voltage 34A, 34B, 34C is used for two functions relating to sustaining the electrical signal oscillation and maintaining sufficient amplitude for a reader to receive communication/response signals from the transponder; whilst managing the energy available in the storage capacitor in an optimum manner. The first function is the comparison of this peak voltage to a reference voltage $V_{Ref}$ to adjust the duration of the "plucking" pulses. In the particular variant shown in FIG. 2, when the measured peak voltage 34A is lower than $V_{Ref}$, logic circuit 14 increases the "plucking" duration by a given step for at least the next "plucking" pulse PL1 to a duration D1 greater than the duration D0 of the preceding "plucking" pulse PL0. When the measured peak voltage 34B is higher than $V_{Ref}$, the logic circuit decreases the "plucking" duration by a given step for at least the next "plucking" pulse PL2 to a duration D2 shorter than D1.

To reduce energy consumption, the peak voltage measurement and the comparison with $V_{Ref}$ may occur only periodically after a certain number of oscillation periods, for example every four or five oscillation periods, and the duration of the pulses is thus only adjusted after this certain number of oscillation periods. The duration of the "plucking" pulses is thus constant throughout several oscillation periods, the variation in this "plucking" duration being performed in steps. In a particular variant, the value of the step used to increase the "plucking" duration is different from the step value used to decrease the "plucking" duration, and in particular is higher. In another variant, the step value changes during the transmission period, particularly once an alternation of increases and decreases in the "plucking" duration is observed, the step value is decreased According to an advantageous variant, the logic circuit is arranged to increase said "plucking" duration up to a given maximum duration. Preferably, when this maximum duration is attained, the subsequent "plucking" pulses in the transmission period concerned have the maximum duration and adjustment of the "plucking" duration ceases in order to save energy. It will be noted that it is also possible to provide a minimum duration for the "plucking" pulses.

Figure 3:
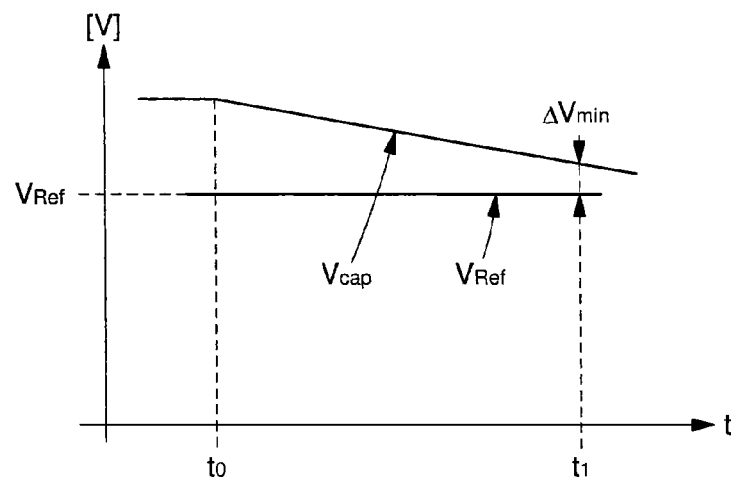
FIG. 3 is a schematic view of the selection of a fixed reference voltage for controlling the "plucking" pulses according to a variant of the invention.

FIG. 3 is a schematic view of a previously described variant, wherein reference voltage $V_{Ref}$ is arranged to be constant in each transmission period. This reference voltage is selected to have at time t1, at the end of the transponder transmission period, at least a minimum voltage difference $\Delta V_{min}$ between storage capacitor voltage $V_{Cap}$ and $V_{Ref}$. Preferably, the reference voltage value is defined at time t0, at the start of the transmission period, as a function of the initial storage capacitor voltage In a more developed embodiment, it is possible to periodically measure voltage $V_{Cap}$ and if $V_{min}$ is attained before time t1, the reference voltage is then decreased so as to maintain at least this minimum voltage difference.

Thus, in a particular variant, only a first measurement of $V_{Cap}$ is provided in a period of signal transmission by the transponder. The level of $V_{Ref}$ is thus determined as a function of the initial storage capacitor voltage. In a simpler variant, the reference voltage is predetermined according to the resonant circuit provided and the quality factor of the transponder. It therefore remains fixed. In a more sophisticated variant, the change in $V_{Cap}$ is followed to determine whether the reference voltage value should advantageously be modified during the period because of the particular or non standard behaviour of the transponder, especially due to a particular environment. However, this latter variant uses more electrical energy.

Figure 4:
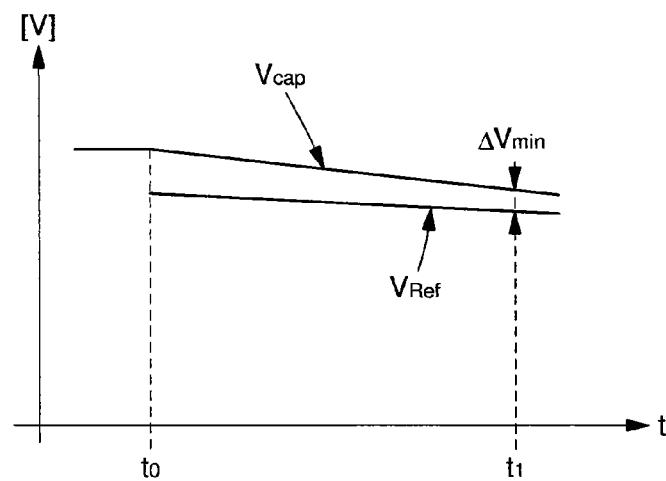
FIG. 4 is a schematic view of the selection of a variable reference voltage for controlling the "plucking" pulses according to another variant of the invention.

FIG. 4 is a schematic view of a variant wherein reference voltage $V_{Ref}$ decreases in the transmission period. $V_{Ref}$ is preferably a function of $V_{Cap}$. In particular, $V_{Ref}$ is a proportional or affine function of $V_{Cap}$. The value of $V_{Cap}$ may be periodically measured and $V_{Ref}$ is determined again after each measurement according to the function provided. It will be noted that the parameters of the function may be fixed and predefined or determined as a function of the initial value of $V_{Cap}$. Moreover, they may even vary as a function of the change in $V_{Cap}$.

Figure 5:
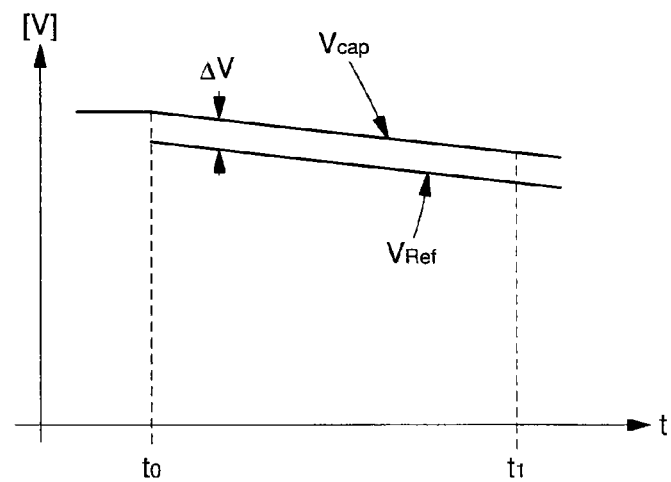
FIG. 5 is a variant of FIG. 4.

FIG. 5 shows a particular variant wherein the reference voltage curve follows that of the storage capacitor voltage. In other words, the difference $\Delta V$ between $V_{Cap}$ and $V_{Ref}$ remains substantially constant.

In the variants where reference voltage $V_{Ref}$ varies, particularly as shown in FIGS. 4 and 5, this reference voltage curve may be recalculated for each subsequent oscillation period or for a certain number of subsequent oscillation periods. However, other operating modes may also be envisaged. In a particular variant, the negative slope of the line provided for $V_{Ref}$ in a transponder signal transmission period is predefined and introduced into memory 30 (however, the value thereof may depend in particular on the antenna 6 selected and/or on the intended application, etc.). In that case, it is possible to provide an initial value that is also predefined or an initial value determined as a function of the initial value of $V_{Cap}$; which then determines the mean level of the curve of $V_{Ref}$. In another more sophisticated variant, a type of expert system may be provided which determines the value of the slope either in an initial transponder test or during operation of the transponder in an initialisation mode.

This expert system may integrate various parameters for adjusting the slope as a function of various criteria, in particular, of the initial storage capacitor value at the start of the transmission period. This initialisation mode may be periodically activated to take account of the ageing of the transponder. Evidently, it is possible to define a curve other than a straight line for the reference voltage.

Depending on the type of application, the security level of the application, and the length of the signals transmitted by the transponder, those skilled in the art will be able to define the appropriate reference voltage curve behaviour to optimise the powering of the resonant circuit by the storage capacitor. Those skilled in the art will take account in the energy balance of the fact that value measurements and comparisons increase the transponder power consumption and they will optimise the frequency of measurements and comparisons to vary the duration of the "plucking" pulses and, if necessary, the reference voltage value.

According to the invention, the second function of measuring the peak voltage of the electrical signal oscillating in the resonant circuit is to determine a variable threshold voltage as a function of the peak voltage, each new determination of the threshold voltage being used to define the start of at least one "plucking" pulse in at least one subsequent half-cycle. Each new threshold voltage value is determined as a function of the last peak voltage measured by the peak voltage detector. It will be noted that when the peak voltage is only measured periodically after a certain number of oscillation periods, this measurement may be used to define a threshold voltage for triggering a group of several successive "plucking" pulses.

As shown in FIG. 2, the "plucking" pulses are preferably delivered in areas around the voltage peaks (extremums) of oscillating electrical signal 32. According to the invention, the start of each "plucking" pulse is in a respective period located before an extremum of the oscillating electrical signal and in the half-cycle of said extremum. This optimises the transfer of energy and limits the generation of harmonics in the oscillating electrical signal, i.e. it limits distortion, particularly when the "plucking" pulses are relatively long. Indeed, when the voltage of the oscillating electrical signal increases, the generation of a "plucking" pulse in the rising flank goes in the natural direction of oscillation, unlike the case where the pulse is delivered in the descending flank. Next, a variable voltage threshold is defined to control the triggering of the "plucking" pulses, whereby the variable voltage threshold is lower in absolute value than the preceding peak voltage measurement of the oscillating electrical signal relative to the middle voltage of the oscillating electrical signal and is a function of said peak voltage, i.e. is dependent on the peak voltage. For example, this variable voltage threshold is equal to 80% of the peak voltage measured in a preceding half-cycle relative to the middle voltage of the oscillating electrical signal. Preferably, the voltage threshold is selected within a range of between 50% and 90% of the peak voltage obtained in the last measurement taken by the peak voltage detector relative to the middle voltage of the oscillating electrical signal.

In the preferred variant shown in FIG. 2, a peak voltage measurement is carried out in each oscillation, in the first oscillation half-cycle. For each "plucking" pulse provided in the second half-cycle of each oscillation, the logic circuit determines the voltage threshold value, as a function of peak voltage 34A, 34B, or 34C, to control the start of the plucking pulse, i.e. the triggering of the plucking pulse. Thus, the threshold voltage is controlled dynamically to trigger the plucking pulses; which ensures that these pulses all occur in an optimum manner. This relatively simple circuit, namely a peak voltage detector and a circuit for defining a variable voltage threshold, which is for example proportional to the measured peak voltage values, optimises the transfer of energy from the storage capacitor to the resonant circuit. In other embodiments, the voltage threshold determination circuit is formed, for example, by a resistive divider or by switched capacitors.

Preferably, to generate one or several plucking pulses, the last peak voltage measurement is used to define a voltage threshold used to trigger the plucking pulse or pulses. This voltage threshold therefore varies in steps as a function of the amplitude of the electrical signal oscillating in the oscillation circuit.

Finally, it will be noted that this second function according to the invention of measuring the peak voltage of the oscillating electrical signal may also advantageously be implemented in a half-duplex passive transponder, which does not use the aforementioned first function of the peak voltage detector. Thus, the present invention also covers embodiments of that type.

The invention claimed is:

1. A half-duplex passive transponder comprising:
   a resonant circuit including an antenna and an input capacitor and configured to allow an electrical signal to oscillate in the resonant circuit when the transponder periodically receives across the antenna an activation signal from a reader;
   a rectifier positioned downstream of the resonant circuit;
   an energy storage capacitor positioned downstream of the rectifier;
   at least one switch positioned between the input capacitor and the storage capacitor so that the input capacitor and storage capacitor are placed in parallel when the switch is turned on;
   a peak voltage detector configured to measure amplitude of the electrical signal oscillating in the resonant circuit;
   wherein the transponder is configured to send at least one communication signal to the reader in a transmission period when the activation signal is interrupted, and to deliver plucking pulses during the transmission period in the resonant circuit to sustain the electrical signal oscillation while maintaining at least a certain amplitude of the oscillating electrical signal;
   wherein the transponder further comprises a variable voltage threshold determination circuit defining, for each plucking pulse, a specific voltage threshold which is used to trigger the plucking pulses and is lower in absolute value than a last peak voltage measured by the peak voltage detector relative to a medium voltage of the oscillating electrical signal such that the specific voltage threshold is redefined after the last measured peak voltage; and
   wherein the transponder is configured to trigger each plucking pulse when the voltage of the oscillating electrical signal substantially attains the specific voltage threshold in a respective period before an extremum of the oscillating electrical signal and in a half-cycle of the extremum.

2. The passive transponder according to claim 1, wherein the specific voltage threshold is defined to be within a range of between 50% and 90% of the last measured peak voltage relative to the medium voltage of the oscillating electrical signal.

3. The passive transponder according to claim 1, wherein the rectifier is a full-wave rectifier.

4. The passive transponder according to claim 3, wherein the peak voltage detector measures the peak voltage in the first half-cycle of each oscillation of the oscillating electrical signal, and wherein, after each peak voltage measurement, the variable voltage threshold determination circuit redefines the specific threshold voltage used to trigger a plucking pulse in the second half-cycle of the same oscillation.

5. The passive transponder according to claim 3, wherein the at least one switch comprises two switches respectively arranged between two terminals of the input capacitor and the storage capacitor to deliver the plucking pulses in each half-cycle of the oscillating electrical signal.

6. The passive transponder according to claim 1, further comprising:
- a logic circuit;
- a means for generating a clock signal;
- a modulator connected at an input to the logic circuit and at an output to the resonant circuit, the switch being controlled by the logic circuit; and
- wherein the logic circuit manages powering of the resonant circuit by the storage capacitor during the transmission period by varying a plucking duration of the plucking pulses.

7. The passive transponder according to claim 6, wherein each peak voltage measured by the peak voltage detector is processed by the logic circuit to determine the plucking duration of at least one following plucking pulse in a following or subsequent half-cycle of the oscillating electrical signal.

8. The passive transponder according to claim 7, wherein the logic circuit is configured to adjust the plucking duration in steps.

9. The passive transponder according to claim 7, wherein, when the peak voltage value is higher than a first reference voltage, the logic, circuit decreases the plucking duration of the at least one following plucking pulse.

10. The passive transponder according to claim 9, wherein the first reference voltage is a function of the voltage of the storage capacitor in the transmission period.

11. The passive transponder according to claim 9, wherein, when the peak voltage is lower than a second reference voltage, the logic circuit increases the plucking duration of the at least one following plucking pulse.

12. The passive transponder according to claim 11, wherein the second reference voltage is a function of the voltage of the storage capacitor in the transmission period or of the first reference voltage.

13. The passive transponder according to claim 11, wherein the second reference voltage is identical to the first reference voltage.

14. The passive transponder according, to claim 1, wherein, when the transponder sends the communication signal to the reader, a peak voltage value is only periodically measured after a certain number of oscillation periods of the oscillating electrical signal.

* * * * *